T. M. AVERY.
CHAIN CONNECTOR.
APPLICATION FILED DEC. 2, 1918.

1,364,018.

Patented Dec. 28, 1920.

Witnesses

Inventor
True M. Avery,
By
Attorney

UNITED STATES PATENT OFFICE.

TRUE M. AVERY, OF GLENS FALLS, NEW YORK, ASSIGNOR TO ARROW-GRIP MANUFACTURING CO., INC., OF GLENS FALLS, NEW YORK, A CORPORATION OF NEW YORK.

CHAIN-CONNECTOR.

1,364,018.     Specification of Letters Patent.     Patented Dec. 28, 1920.

Original application filed February 10, 1917, Serial No. 147,856. Divided and this application filed December 2, 1918. Serial No. 264,972.

*To all whom it may concern:*

Be it known that I, TRUE M. AVERY, a citizen of the United States, residing at Glens Falls, in the county of Warren and State of New York, have invented new and useful Improvements in Chain-Connectors, of which the following is a specification.

This application is filed as a division of my pending application Serial No. 147,856. This invention relates to an improvement in chain connectors for use in environments in which two chain links, or analogous parts, are to be secured in a relation of mutual adjacency, to some relatively fixed object. As an illustration of such an environment, reference may be made to the well known practice of providing the tires of motor trucks with external cross chains for anti-skidding purposes.

The objects of the invention, briefly stated, are to facilitate the operations of securing and releasing the adjacent chain links, to provide for the certain and reliable securement of said links under all conditions, and to provide a chain connector which, along with the above advantages, is strong and durable, readily applicable to the relatively fixed object adjacent which the links are to be secured and simple and inexpensive in construction.

With the above objects in view, the invention consists in certain novel features of structure and relation appertaining to the combination of a pair of opposed pivotally mounted hooks for the respective links, means to close the hooks in a certain position thereof, means to retain the hooks against accidental displacement from their closed position, and a supporting plate by which the connector may be mounted upon the relatively fixed object, all of which will be set forth in detail as the description proceeds.

An embodiment of the invention is illustrated in the accompanying drawings, wherein:—

Figure 1:
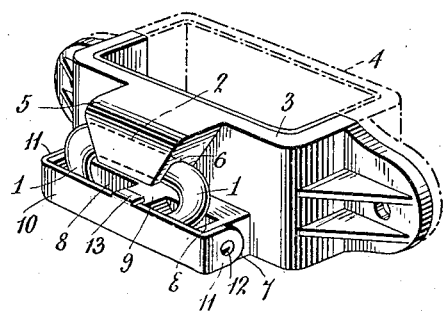
Figure 2:
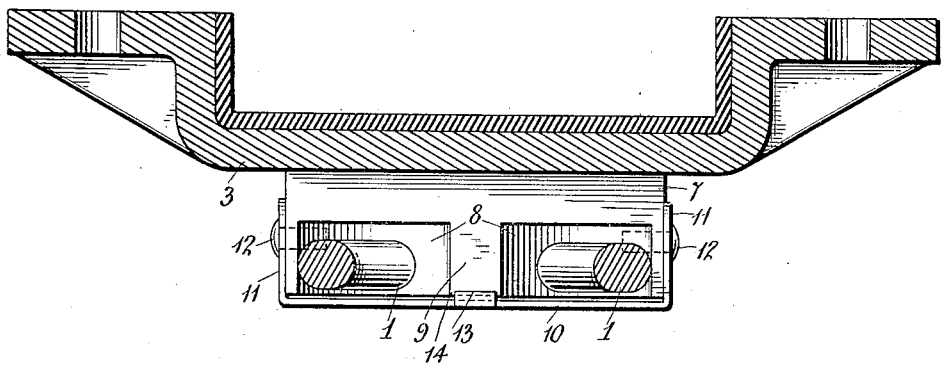
Figure 3:
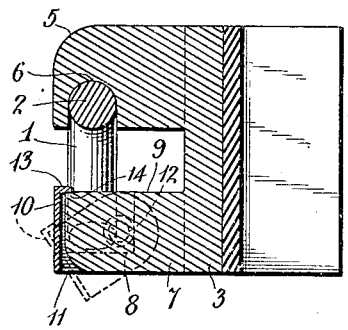

Figure 1 is a perspective view of a chain connector in which the features of the invention are incorporated; and Figs. 2 and 3 are, respectively, horizontal and vertical sectional views of the same.

Similar characters of reference designate corresponding parts throughout the several views.

The invention is shown in a form by which it is especially adapted as an element of an anti-skid device for tires wherein a cross chain is arranged transversely of the tire, but it will be understood that the invention is susceptible of expression in other forms, adapting it to other environments of use. The hooks 1 and the parts associated with said hooks are mounted upon a suitable supporting plate 3 by which the chain connector may be attached to a relatively fixed object. In the adaptation of the chain connector as an element of an anti-skid device for tires, the plate 3 may, as shown, be formed to take over a spoke adjacent the felly, and as thus formed, will coöperate with a companion clamp member 4, indicated by broken lines in Fig. 1; and the positional relation of the hooks 1 and the parts associated therewith on said plate is coördinated to the form of the plate as enabling its application to a particular wheel part, whereby when the plate is attached to said wheel part the hooks will be located between adjacent spokes and the terminals of the hooks will be in a plane transverse to the common plane of the spokes. Where the plate 3 is thus formed as a clamp member to take over a spoke in the adaptation of the chain connector as an element of an anti-skid device for tires, the hooks 1 may be mounted upon a flange or web 5 which projects at a right angle from said plate and is adapted to have a flat and somewhat extensive bearing against the felly whereby the opposite pull of the cross chains will, through said flange or web, be directed against the felly. The present invention, however, is not concerned with these disclosed features of form and relation, which are peculiar to the specific chain connector shown only as said chain connector may have the character of an element of the anti-skid device which forms the subject of my said pending application, Serial No. 147,856.

According to the invention, the hooks 1 are pivotally mounted for movement toward or from the plate 3, and in the construction preferred, said hooks are provided at the ends of a shank 2 which is rotatably fitted in a recess 6 extending between the ends of the flange or web 5, said shank and recess being disposed transversely of the plate 3.

The hooks 1 are disposed in a common plane and in their closed position said plane is parallel to the plane of said plate. The invention includes means for closing the hooks when in the position just stated, and for such purpose, the plate 3 is preferably provided with a flange 7 which projects therefrom in the same direction as the flange 5 and is suitably spaced from said flange 5. The flange 7 is formed with recesses 8 which are open to its front face and with a lug or projection 9 intermediate the recesses. When the hooks are in their closed position their terminal portions engage or are disposed in the recesses 8 and the flange 7 serves positively to prevent the disengagement of the chain links from the hook.

The invention also includes means for holding the hooks against accidental displacement from their closed position, and such means preferably consists of a keeper in the form of a spring metal strip 10 having at its ends angular lugs or ears 11 which are secured by pivot pins 12 to the sides of the flange 7, said keeper having a normal position wherein it closes the open sides of the recesses 8 and prevents the movement of the hooks 1 beyond said recesses. The keeper 10 has a central spring lip or catch 13 to frictionally engage over the edge 14 of the lug or projection 9, as shown by Fig. 3, thereby to hold the keeper in its normal or operative position.

When the chain links are to be disengaged the keeper is swung outward about the pivot pins 12, as shown by dotted lines in Fig. 3, to a position wherein it uncovers the open sides of the recesses 8, at which time the hooks 1 are swung outward, i. e. away from the plate 3, the shank 2 functioning as a pivot, beyond the recesses 8, and the chain links are disengaged from said hooks by a movement through the passage delimited by the adjacent ends of the hooks.

In engaging the chain links the keeper and the hooks are moved to their open positions as just described and the links are engaged with the hooks by introducing them through the passage delimited by the adjacent ends of the hooks, whereupon the hooks are moved toward the plate 3 until their ends enter the recesses 8 and the keeper 10 is restored to its normal position as shown in the drawing, being held against accidental displacement from such position by the frictional engagement of the catch 13 over the edge 14 of the lug or projection 9.

Having fully described my invention, I claim—

1. A device for securing chains comprising an attachment plate, a pair of opposed hooks pivotally mounted for movement toward said plate, a flange projecting from said plate for closing said hooks in a certain position thereof, and means coöperating with said flange and hooks for holding the latter in said certain position.

2. A device for securing chains comprising an attachment plate, a flange projecting from said plate, an element pivoted to said flange and provided with a pair of opposed hooks, a second flange projecting from said plate for closing said hooks in a certain position thereof, and means coöperating with said second flange and hooks for holding the latter in said certain position.

3. A device for securing chains comprising an attachment plate, a rotatably mounted shank disposed transversely of said plate and provided with opposed terminal hooks lying in a common plane, a flange projecting from said plate for closing said hooks in a certain position thereof, said flange having open-sided recesses in which the terminals of said hooks engage when the hooks occupy said position, a keeper pivotally mounted on said flange and normally closing the open sides of said recesses, and means for holding said keeper in its normal position.

4. Two parts fixedly mounted with relation to, and at an interval from, each other, in combination with a third element pivotally connected to one of said parts, provided with hooks having their free ends closed by the other of said parts against the ingress or egress of an endless article and having a portion engaging said part, and means for locking said element in such position.

In testimony whereof I have hereunto set my hand in presence of two subscribing witnesses.

TRUE M. AVERY.

Witnesses:
GLENCORA BEAUDOIN,
THERESA KEENAN.